(12) United States Patent
Onaya et al.

(10) Patent No.: US 9,145,167 B2
(45) Date of Patent: Sep. 29, 2015

(54) REAR WHEEL STEERING VEHICLE

(75) Inventors: Hideki Onaya, Wako (JP); Takashi Yanagi, Wako (JP); Hiroaki Sasaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 962 days.

(21) Appl. No.: 12/921,685

(22) PCT Filed: Jan. 30, 2009

(86) PCT No.: PCT/JP2009/000357
§ 371 (c)(1),
(2), (4) Date: Sep. 9, 2010

(87) PCT Pub. No.: WO2009/113233
PCT Pub. Date: Sep. 17, 2009

(65) Prior Publication Data
US 2011/0046851 A1    Feb. 24, 2011

(30) Foreign Application Priority Data
Mar. 10, 2008 (JP) .................. 2008-059213

(51) Int. Cl.
B62D 7/15    (2006.01)
B62D 7/14    (2006.01)

(52) U.S. Cl.
CPC ............... *B62D 7/159* (2013.01); *B62D 7/148* (2013.01)

(58) Field of Classification Search
CPC .............................. B62D 7/159; B62D 7/148
USPC ............................................................ 701/41
See application file for complete search history.

(56) References Cited

U.S. PATENT DOCUMENTS 7,325,818 B1 *    2/2008 Kwon ...................... 280/86.758
2003/0014176 A1 *    1/2003 Levine ............................ 701/70
2005/0275285 A1 *    12/2005 Higuchi ........................ 303/146
2008/0215223 A1 *    9/2008 Yamada et al. ................. 701/81

FOREIGN PATENT DOCUMENTS

JP    9030438    2/1997
JP    9123889    5/1997

* cited by examiner

Primary Examiner — Thomas Tarcza
Assistant Examiner — Kevin Myhre
(74) Attorney, Agent, or Firm — Rankin, Hill & Clark LLP

(57) ABSTRACT

In a rear wheel steering vehicle equipped with a vehicle motion stability control system that can be selectively switched on and off, the motion stability of the vehicle is prevented from being impaired when an abnormal condition should develop to a rear wheel steering device of the vehicle. In addition to the rear wheel steering device, the vehicle is provided with an abnormal condition processing unit that turns on the vehicle motion stability control system upon detection of the abnormal condition of the rear wheel rear wheel steering device while the vehicle motion stability control system is turned off.

6 Claims, 4 Drawing Sheets

REAR WHEEL STEERING VEHICLE

TECHNICAL FIELD

The present invention relates to a rear wheel steering vehicle that can steer the rear wheels of the vehicle depending on a miming condition of the vehicle, and in particular to a rear wheel steering vehicle equipped with a vehicle motion stability control system that can be selectively turned on and off.

BACKGROUND OF THE INVENTION

In a known rear wheel steering vehicle, an actuator is provided between a link mechanism that determines the steering angle and the vehicle body, and the steering angles of the right and left wheels are individually varied depending on the cornering condition of the vehicle by extending and retracting the actuator so as to change the dimension between the vehicle body and link mechanism. See Japanese patent laid open publication (kokai) No. 09-030438 (patent document 1). Such a rear wheel steering vehicle may include devices for stabilizing the motion stability of the vehicle such as a ABS (anti-lock braking system) for preventing the locking of wheels when braking, TCS (traction control system) for preventing the free miming of wheels when accelerating the vehicle and VSA (vehicle stability assist syStem) that is additionally provided with a function to limit a side slipping of the vehicle when cornering.

In connection with rear wheel steering vehicles equipped with a vehicle motion stability control system, it is known to prohibit the control action of the vehicle motion stability control system when the rear wheel steering device has become faulty and is thereby rendered incapable of performing a normal rear wheel steering. See Japanese patent laid open publication (kokai) No. 09-123889 (patent document 2).

In the rear wheel steering vehicle disclosed in patent document 1, upon occurrence of a failure in the rear wheel steering control device, the control by the vehicle motion stability control system is disabled. However, if the rear wheels are caused to be fixed in a certain condition (such as a toe out condition) owing to the occurrence of a failure (such as system down) of the rear wheel steering control device, the motion stability of the vehicle when traveling straight ahead or making a turn may be impaired. Therefore, if the vehicle motion stability control system is capable of operating properly, it is desirable to activate the vehicle motion stability control system upon occurrence of an abnormal condition in the rear wheel steering control device so as to achieve a motion stability of the vehicle. In particular, if the vehicle is equipped with a vehicle motion stability control system that can be selectively turned on and off, it is necessary to force the vehicle motion stability control system to be turned on when the vehicle motion stability control system is turned off.

BRIEF SUMMARY OF THE INVENTION

In view of such problems of the prior art, a primary object of the present invention is to provide a rear wheel steering vehicle that can prevent vehicle motion stability from being impaired upon occurrence of a failure of the rear wheel steering control while vehicle motion stability control system is turned off by positively activating the vehicle motion stability control system.

According to the present invention, such an object can be accomplished by providing a rear wheel steering vehicle equipped with a vehicle motion stability control system that can be selectively switched on and off, comprising: a rear wheel steering device including a rear wheel actuator that steers a right and left rear wheel and a rear wheel steering control unit that controls the rear wheel steering actuator; and an abnormal condition processing unit that turns on the vehicle motion stability control system upon detection of an abnormal condition of the rear wheel rear wheel steering device while the vehicle motion stability control system is turned off.

Thus, when the rear wheel steering device becomes faulty while the vehicle motion stability control system is turned off or otherwise deactivated, the abnormal condition processing unit turns on or activates the motion stability control system, and this prevents the motion stability of the vehicle from being impaired by the faulty condition of the rear wheel steering device.

According to a preferred embodiment of the present invention, the rear wheel steering device further comprises a toe angle sensor for detecting a rear wheel toe angle, and the abnormal condition processing unit turns on the vehicle motion stability control system only when a toe out condition of the rear wheels is detected. As a toe out condition is particularly undesirable for the motion stability of the vehicle, this feature is particularly effective in promoting the motion stability of the vehicle while minimizing the impact of the abnormal condition processing unit on the operation of the vehicle motion stability control system. It is particularly the case if the abnormal condition processing unit turns on the vehicle motion stability control system only when a toe out magnitude of the rear wheels has exceeded a prescribed threshold value.

As the vehicle speed has a strong influence of the motion stability of the vehicle, it is desirable if the vehicle further comprises a vehicle speed sensor, and the abnormal condition processing unit turns on the vehicle motion stability control system only when a detected vehicle speed meets a prescribed condition.

According a certain aspect of the present invention, the vehicle further comprises a manual switch for switching over the vehicle motion stability control system between a turned on condition and a turned off condition, and the abnormal condition processing unit turns on the vehicle motion stability control system with a prescribed time delay when the vehicle motion stability control system is brought to a turned off condition by being previously turned off manually by using the manual switch. Alternatively, the vehicle may be configures such that the manual switch totally overrides the abnormal condition processing unit so that the abnormal condition processing unit does not turn on the vehicle motion stability control system at all when the vehicle motion stability control system is brought to a turned off condition by being previously turned off manually by using the manual switch.

Thereby, in case the vehicle operator wishes to temporarily turn off the vehicle motion stability control system under a certain operating condition of the vehicle, the vehicle motion stability control system can be turned on without obstructing the vehicle operator's effort to control the vehicle.

BRIEF DESCRIPTION OF THE DRAWINGS

Now the present invention is described in the following with reference to the appended drawings, in which.

DETAILED DESCRIPTION OF THE PREFERRED EMBODIMENTS

Now the present invention is described in the following with reference to the appended drawings, in which each wheel and associated components such as a tire and a suspension system are denoted with suffixes such as R and L in addition to the corresponding numeral to indicate the positioning of the corresponding component such as "left rear wheel 5L and right rear wheel 5R". When the various components are generally referred to, they are collectively denoted only with the corresponding numeral such "rear wheels 5".

Figure 1:
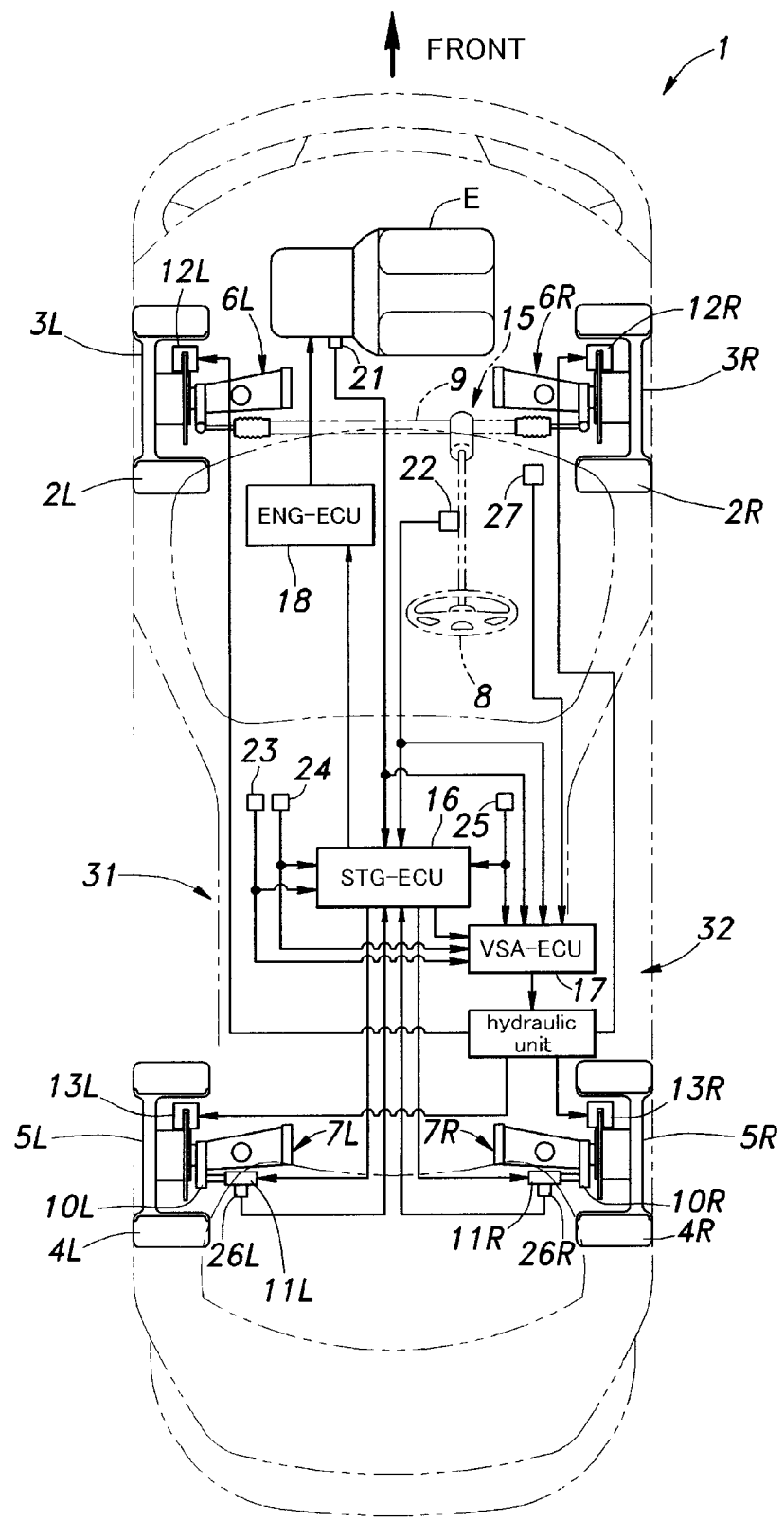
FIG. 1 is a block diagram of a vehicle equipped with a rear wheel steering device embodying the present invention.
Figure 2:
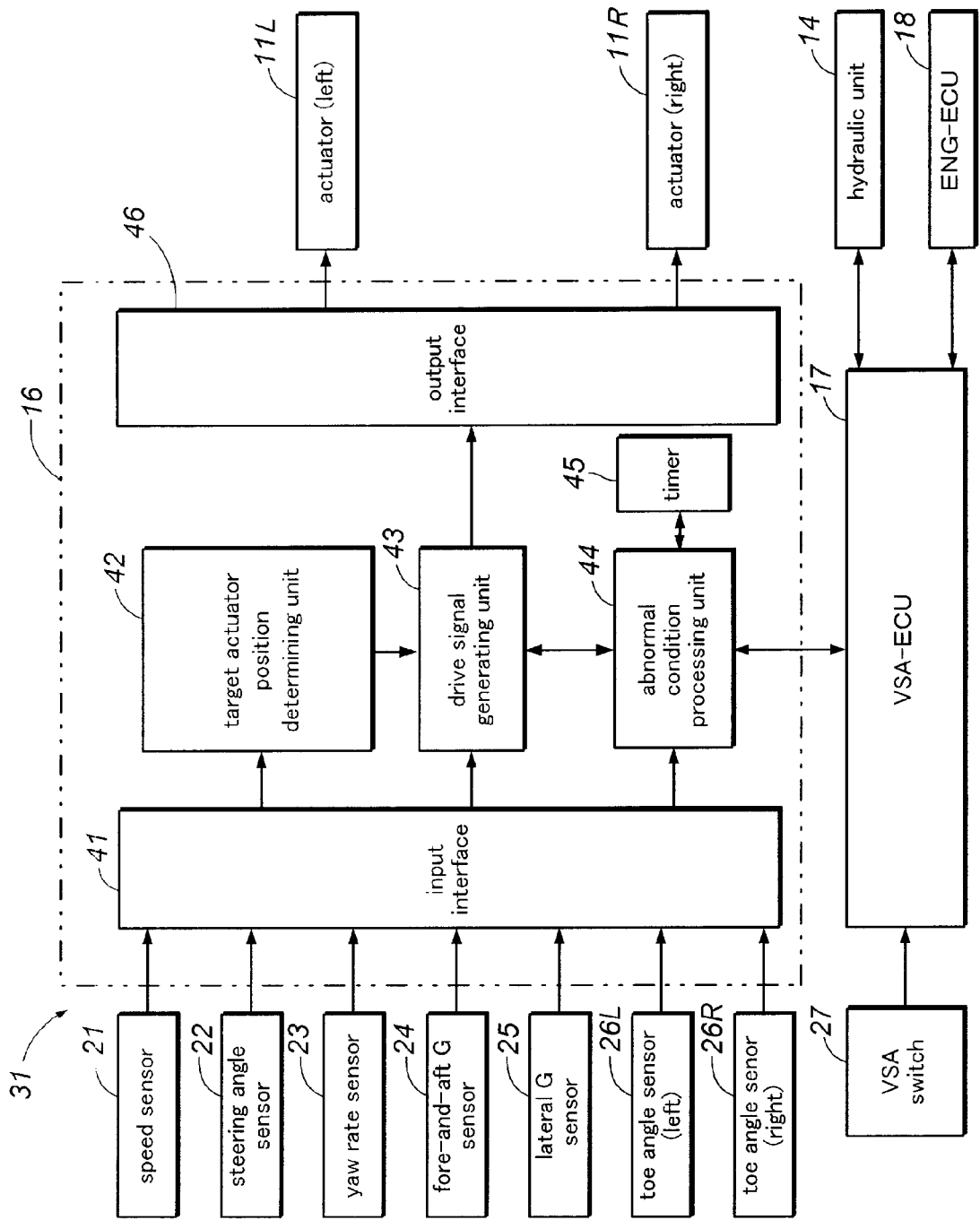
FIG. 2 is a functional block diagram of the rear wheel steering device of the present invention.

FIG. 1 is a schematic diagram of a motor vehicle equipped with a rear wheel steering device embodying the present invention, and FIG. 2 is a functional block diagram of the rear wheel steering device.

Referring to FIG. 1, the vehicle (rear wheel steering vehicle) 1 comprises a pair of front wheels 3L and 3R fitted with tires 2L and 2R, respectively, and rear wheels 5L and 5R fitted with tires 4L and 4R, respectively. These front and rear wheels 3 and 5 are supported by the vehicle body by corresponding front wheel and rear wheel suspension systems 6 and 7. The vehicle 1 further comprises a front wheel steering device 9 for directly steering the right and left front wheels 3L and 3R according to a turning of a steering wheel 8, an EPS (electric power steering) system 15 for providing a power assist to the front wheel steering device 9 and a pair of actuators 11L and 11R that are connected to knuckles 10L and 10R of the right and left rear wheels suspension systems 7L and 7R and configured to individually change the steering angles of the rear wheels 5L and 5R by individually extending and retracting themselves. Brakes 12L and 12R for the front wheels 3 and brakes 13L and 13R for the rear wheels 5 are connected to a hydraulic unit 14 that supplies actuating oil under pressure to these brakes 12 and 13 as required.

The vehicle 1 further comprises various control units such as a EPS-ECU (EPS electronic control unit) (not shown in the drawing) incorporated in the EPS device 15 for controlling the operation of the EPS device 15, a STG-ECU (steering electronic control unit) 16 for controlling the steering of the rear wheels as will be described hereinafter, a VSA-ECU 17 for controlling a VSA (vehicle stability assist device) and a ENG-ECU 18 for controlling an engine E. These ECUs 16 to 18 are connected to various sensors such as a vehicle speed sensor 21 for detecting a vehicle speed, a steering angle sensor 22 for detecting an angular position of the steering wheel 8, a yaw rate sensor 23 for detecting a yaw rate of the vehicle, a lateral G sensor 24 for detecting a lateral acceleration of the vehicle, a fore-and-aft G sensor 25 for detecting a fore-and-aft acceleration of the vehicle, and also to toe angle sensors 26L and 26R for detecting toe angles of the rear wheels 5L and 5R, respectively, from the displacements of the corresponding actuators 11L and 11R. The detection signals of these sensors 21 to 26 are used for the control of the ECUs 16 to 18. A VSA switch 27 is provided adjacent to a driver's seat not shown in the drawings to enable the VSA-ECU 17 to be manually turned on and off as desired.

The STG-ECU 16, VSA-ECU 17 and ENG-ECU 18 are each provided with a microcomputer, ROM, RAM, a peripheral circuit, an input/output interface and various drivers, and are mutually connected with one another via appropriate communication lines. In the vehicle 1, the STG-ECU 16 forms a rear wheel steering device 31 jointly with the sensors 21 to 26 and actuators 11L and 11R, and the VSA-ECU 17 forms the VSA 32 jointly with the sensors 21 to 25 and VSA switch 27.

As shown in FIG. 2, the STG-ECU 16 essentially consists of an input interface 41 that are connected to the various sensors 21 to 26 and receive detection signals from these sensors, a target actuator position determining unit 42 for determining target actuation positions of the actuators 11 according to the information obtained from the sensors 21 to 26, a drive signal generating unit 43 for generating a drive signal for controlling each of the actuators 11, an abnormal condition processing unit 44 for turning on the VSA 32 when an abnormal condition has occurred to the rear wheel steering control while the VSA 32 is turned off under a prescribed condition as will be described hereinafter, a timer 45 for measuring time and an output interface 46 connected to the actuators 11.

The target actuator position determining unit 42 determines target actuator positions of the actuators 11 according to the running condition of the vehicle (that may include the detection signals of the vehicle speed sensor 21 and steering angle sensor 22 in the illustrated embodiment), and forwards the information on the target actuator positions to the drive signal generating unit 43 as required. In this case, the target actuator positions can be determined by using a formula including running condition variables of the vehicle such as the vehicle speed and steering angle as variables or by looking up a map representing a relationship between the target actuator positions and running condition variables such as vehicle speed and steering angle.

As will be discussed in more detail hereinafter, upon detection of an abnormal condition of the rear wheel steering device 31, the abnormal condition processing unit 44 determines if a prescribed condition for forcing the VSA 32 to be turned on (VSA-on condition) is met. If the condition is met, the abnormal condition processing unit 44 forwards a forced actuation signal to the VSA-ECU 17 so that the VSA 32 moves on or switches over from the turned off state to the turned on state. The abnormal condition of the rear wheel steering device 31 as used herein may include the case where the toe angles of the rear wheels 5 are fixed at a certain angle owing to a failure in the system and the case where the detection of the toe angles of the rear wheels has become impossible owing a failure associated with the toe angle sensors 26. The VSA-on condition may include the toe out magnitude of the rear wheels computed from the detection signals of the toe angle sensors 26 and the vehicle speed detected by the vehicle speed sensor.

The VSA-ECU 17 determines the control variables of the hydraulic unit 14 and ENG-ECU 18 according to the detection signals of the various sensors 21 to 25, and forwards the determined control variable values to the hydraulic unit 14 and ENG-ECU 18 as prescribed control signals. The VSA control of the VSA-ECU 17 contributes to the stabilization of vehicle motion by providing an ABS action for preventing the locking of the wheels at the time of braking, a TSC action that prevents the free rotation of the wheels at the time of acceleration, and other per se known control actions such as those that control the side slip of the vehicle when cornering. At the same time, the vehicle operator is enabled to turn off the VSA-ECU 17, if so desired, to temporarily interrupt the VSA control by operating the VSA switch 27 under a certain condition such as when the tires are stuck in mud often caused by rain or snow, and this helps the vehicle to get out of the mud.

Upon occurrence of an abnormal condition in the rear steering control, even when the VSA-ECU 17 is in a turned off state, the VSA-ECU 17 is turned back on by receiving the forced activation signal from the abnormal condition processing unit 44 of the STG-ECU 16.

Figure 3:
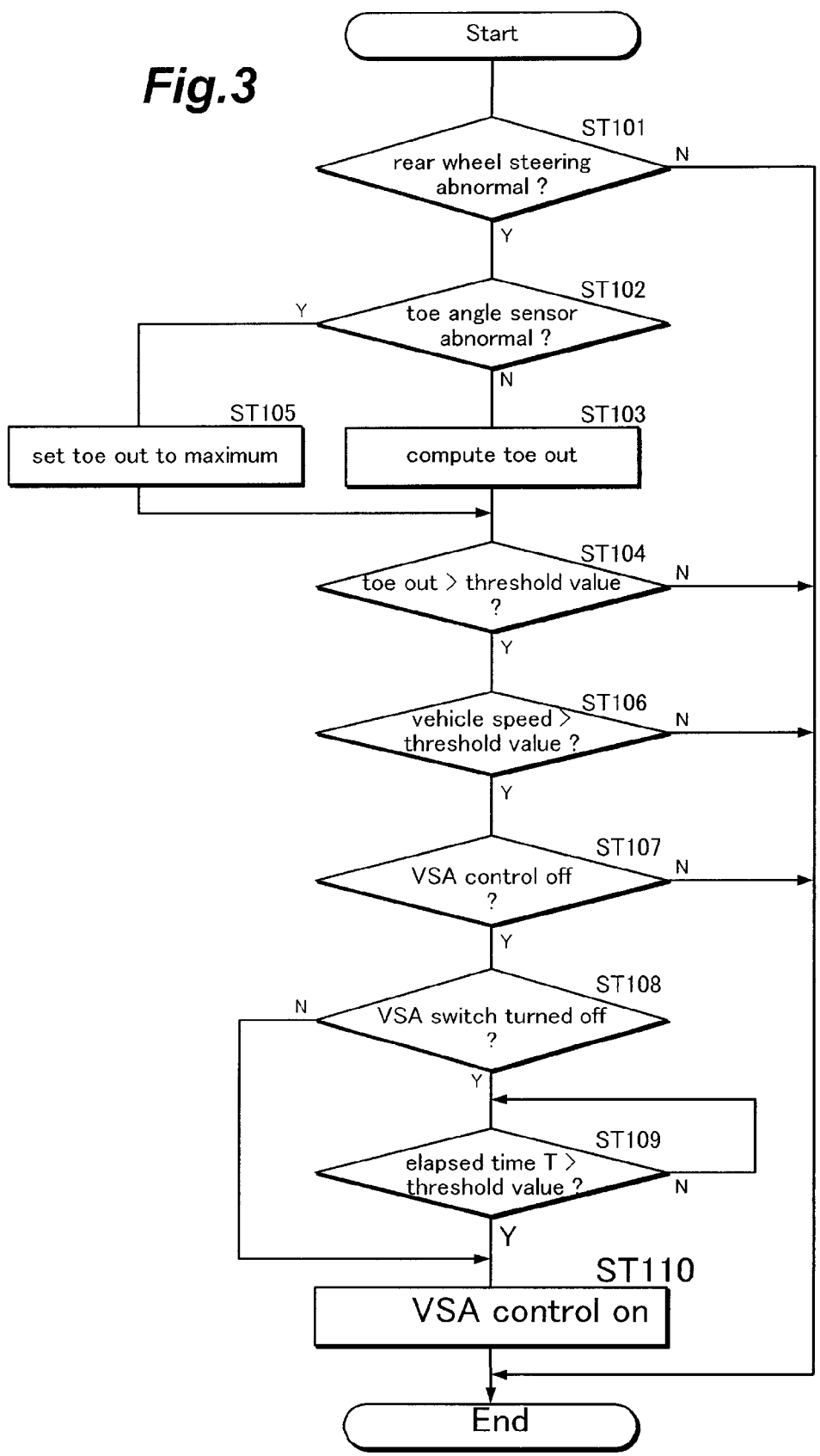
FIG. 3 is a flowchart of a forced activation control for a VSA according to the present invention.

FIG. 3 is a flowchart showing the process of forced activation of the VSA upon occurrence of an abnormal condition in the rear wheel steering control shown in FIG. 2.

First of all, upon detection of an abnormal condition (ST101: yes), the abnormal condition processing unit 44 determines if the abnormal condition is caused by a fault of the toe angle sensors 26 (such as when the detection signal is not available owing to the breaking of wire and so on) in step ST102. If the toe angle sensors 26 are not faulty (ST102: no), the abnormal condition processing unit 44 computes the toe out magnitude from the detection signal of the toe angle sensors 26 in step ST103, and determines if the detection value is greater than a prescribed threshold value in step ST104. This threshold value can be determined by considering how the toe out magnitude of the rear wheels affects the motion stability of the vehicle. On the other hand, if the toe angle sensors 26 are found to be faulty (ST102: yes), as it is impossible to determine the actual toe out magnitude of the rear wheels in such a case, the abnormal condition processing unit 44 sets the toe out magnitude to a prescribed maximum value as a fail safe action in step ST105, and the program flow advances to step ST104.

If the computed value of the toe out magnitude is found to be greater than the prescribed threshold value in step ST104 (yes), the abnormal condition processing unit 44 determines if the vehicle speed detected by the vehicle sensor 21 is greater than a prescribed threshold value in step ST106. This threshold value can be determined by considering how the vehicle speed affects the motion stability of the vehicle. It should be noted that a toe out condition is particularly harmful in maintaining the motion stability of the vehicle according to the study conducted by the inventors. If the detected vehicle speed is greater than the threshold value (ST106: yes), the abnormal condition processing unit 44 determines if the VSA control is turned off in step ST107. If the VSA control is turned off (ST107: yes), it is then determined if it is caused by the turning off operation of the VSA switch 27 in step ST108. The determination process in step ST108 may be executed in such a manner that the VSA-ECU 17 stores the operation information of the VSA switch 27 after starting the engine in prescribed memory, and the abnormal condition processing unit 44 acquires this operation information.

On the other hand, if the computed value of the toe out magnitude is found to be smaller than the prescribed threshold value in step ST104 (no), the detected vehicle speed is smaller than the threshold value in ST106 (no) or the VSA control is not turned off in ST107 (no), the program flow returns to step ST101.

If the VSA switch 27 is not turned off following the starting of the engine (ST108: no), the abnormal condition processing unit 44 promptly switches over the VSA 32 from the turned off state to the turned on state by forwarding a forced actuation signal to the VSA-ECU 17 in step ST110. If the VSA switch 27 is turned off following the starting of the engine (ST108: yes), the elapsed time from the time when the VSA switch 27 was turned off is measured by using the timer 45 in step ST109, and this continues until a prescribed time period (threshold value) has elapsed, and the VSA 32 is switched over from the off state to the on state in step ST110.

In this case, if the VSA switch 27 is turned off following the starting of the engine, the timer 45 starts counting time to measure the elapsed time, and this continues until the VSA 27 is manually turned on again, and the timer 45 is reset.

In the forced actuation control for the VSA discussed above, because the extent of the impairment of the vehicle motion stability is increased with the toe out magnitude at which the rear wheels are fixed owing to an abnormal condition of the rear wheel steering control, it is necessary that the VSA is switched over to the turned on state at a relatively low vehicle speed. Therefore, instead of steps ST104 and ST106 shown in FIG. 3, a determination map that represents the relationship between the toe out magnitude of the rear wheels and vehicle speed may be used as a combined step for determining if the VSA-on condition is met.

Figure 4:
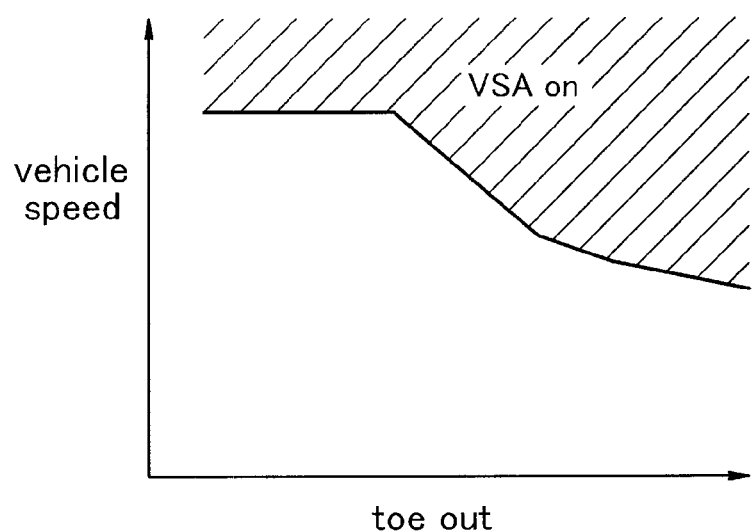
FIG. 4 is a graph representing a map for determining a condition for turning on the VSA in the VSA forced actuation control.

In this case, as indicated by the hatched area in FIG. 4, when the toe out magnitude is relatively small, as its influence on vehicle motion stability is small, the VSA-on condition may be met at a relatively high vehicle speed. Conversely, when the toe out magnitude is relatively large, as its influence on the vehicle motion stability is significant, the VSA-on condition may be met at a relatively low vehicle speed. Therefore, instead of relying on steps ST104 and ST106, in the combined alternate step, the abnormal condition processing unit 44 looks up the map of FIG. 4 according to the information on the toe out magnitude of the rear wheels 5 and vehicle speed, and executes the process that leads to step ST107, when the toe out magnitude and vehicle speed fall in the area (hatched area) in which the toe out magnitude and vehicle speed satisfy the VSA-on condition.

In this way, in the vehicle described above, even when an abnormal condition such as the freezing or fixing of the rear wheel toe angle should occur to the rear wheel steering control while the VSA is turned off, because the VSA control is forced into the on condition, the vehicle motion stability is prevented from being impaired to a significant extent. In particular, by forcing the VSA into the turned on state only when the rear wheels are in a toe out condition, the VSA can be property operated so that the impairment of the vehicle motion stability can be prevented in an effective manner. Furthermore, when the VSA switch is turned off by a vehicle operator, by suspending or delaying the switch over of the VSA to the on state for a prescribed period of time, the driving effort of the vehicle operator while the VSA is turned off is not obstructed, and this contributes to the prevention of impairment of the vehicle motion stability Although the present invention has been described in terms of a preferred embodiment thereof, it is obvious to a person skilled in the art that various alterations and modifications are possible without departing from the scope of the present invention which is set forth in the appended claims. For instance, the abnormal condition processing unit (as well as the timer) may not be provided in the STG-ECU, but may also be provided in the VSA-ECU. The EPS-ECU may also be incorporated in the foregoing system to provide an option in the overall control of the vehicle.

The contents of the original Japanese patent application on which the Paris Convention priority claim is made for the present application are incorporated in this application by reference.

List of Numerals 1 vehicle
5 rear wheel
11 actuator
16 STG-ECU
17 VSA-ECU
21 vehicle speed sensor
22 steering angle sensor
23 yaw rate sensor 24 lateral G sensor
25 for-and-aft sensor
26 toe angle sensor
27 VSA sensor
31 rear wheel steering device
32 VSA
44 abnormal condition processing unit
45 timer

The invention claimed is:

1. A vehicle with rear wheel steering, comprising:
   a motion stability control system that defines an on condition in which stability control is provided to the vehicle and an off condition in which stability control is not provided to the vehicle;
   a manual switch that includes an on position to set the motion stability control system to the on condition and an off position to set the motion stability control system to the off condition;
   a rear wheel steering device including a rear wheel actuator that steers a right and left rear wheel and a rear wheel steering control unit that controls the rear wheel steering actuator; and
   an abnormal condition processing unit that forces the motion stability control system to be in the on condition even when the manual switch is in the off position upon detection of an abnormal condition of the rear wheel steering device.

2. The vehicle according to claim 1, wherein the rear wheel steering device further comprises a toe angle sensor for detecting a rear wheel toe angle, and the abnormal condition processing unit sets the motion stability control system to the on condition only when a toe out condition of the rear wheels is detected.

3. The vehicle according to claim 2, wherein the abnormal condition processing unit sets the motion stability control system to the on condition only when a toe out magnitude of the rear wheels has exceeded a prescribed threshold value.

4. The vehicle according to claim 1, further comprising a vehicle speed sensor, the abnormal condition processing unit sets the motion stability control system to the on condition only when a detected vehicle speed meets a prescribed condition.

5. The vehicle according to claim 1, wherein the abnormal condition processing unit sets the motion stability control system to the on condition with a prescribed time delay when the motion stability control system is brought to the off condition by being previously set to the off condition by the manual switch.

6. A method of controlling a vehicle with rear wheel steering, comprising the steps:
   operating a motion stability control system of the vehicle in an on condition when a manual switch is set to an on position, wherein the on condition is defined as when the motion stability control system provides stability control to the vehicle;
   operating the motion stability control system of the vehicle in an off condition when the manual switch is set to an off position, wherein the off condition is defined as when the motion stability control system does not provide stability control to the vehicle;
   sensing a condition of a rear wheel steering device of the vehicle, wherein the rear wheel steering device defines a normal state in which the rear wheel steering device is operating properly and an abnormal state in which the rear wheel steering device is not operating properly; and
   forcing the motion stability control system to operate in the on condition even when the manual switch is set to the off position upon detection of the abnormal state of the rear wheel steering device.

* * * * *